Figure 3:
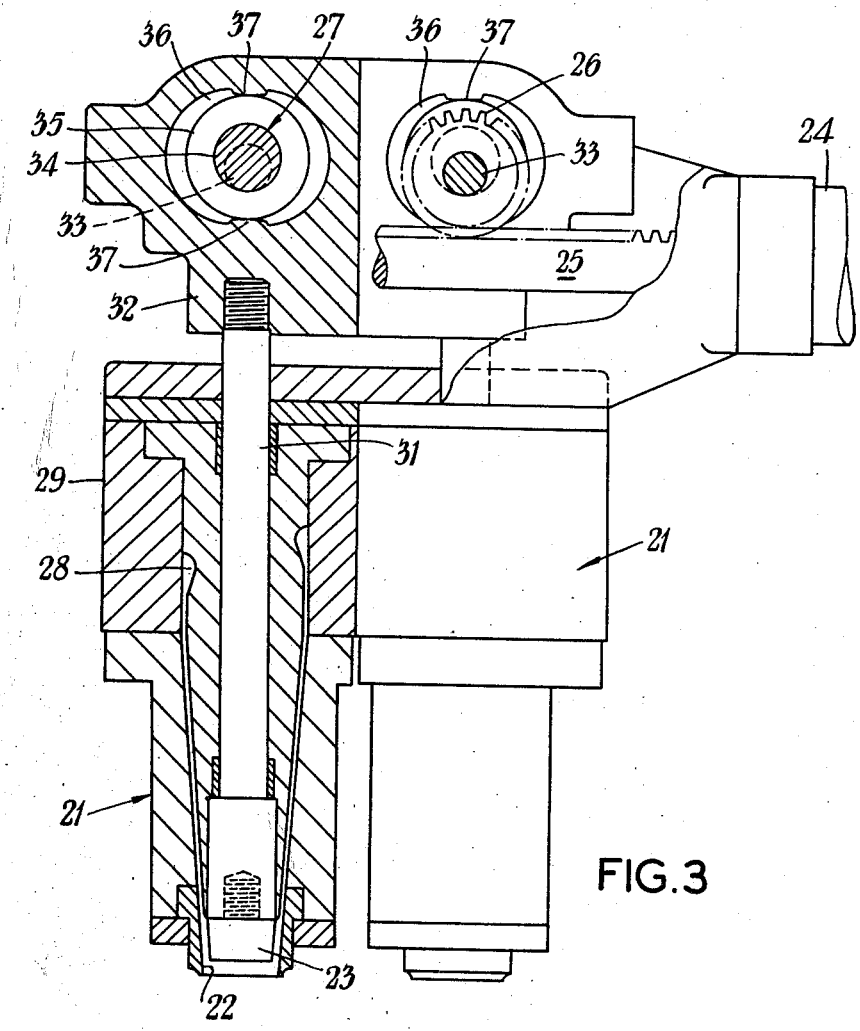

June 1, 1965   N. F. HARWOOD   3,186,032
VARIABLE AREA CROSS-HEAD
Filed Aug. 17, 1962   3 Sheets-Sheet 1
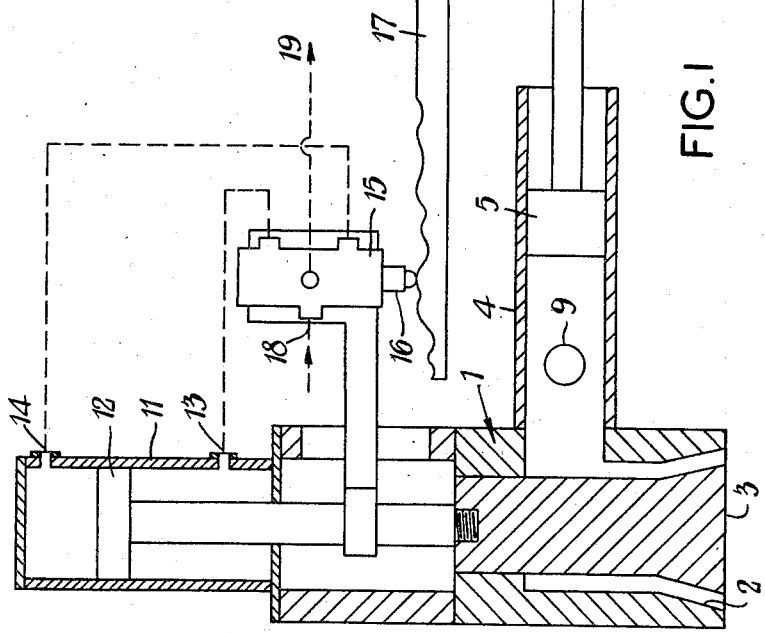

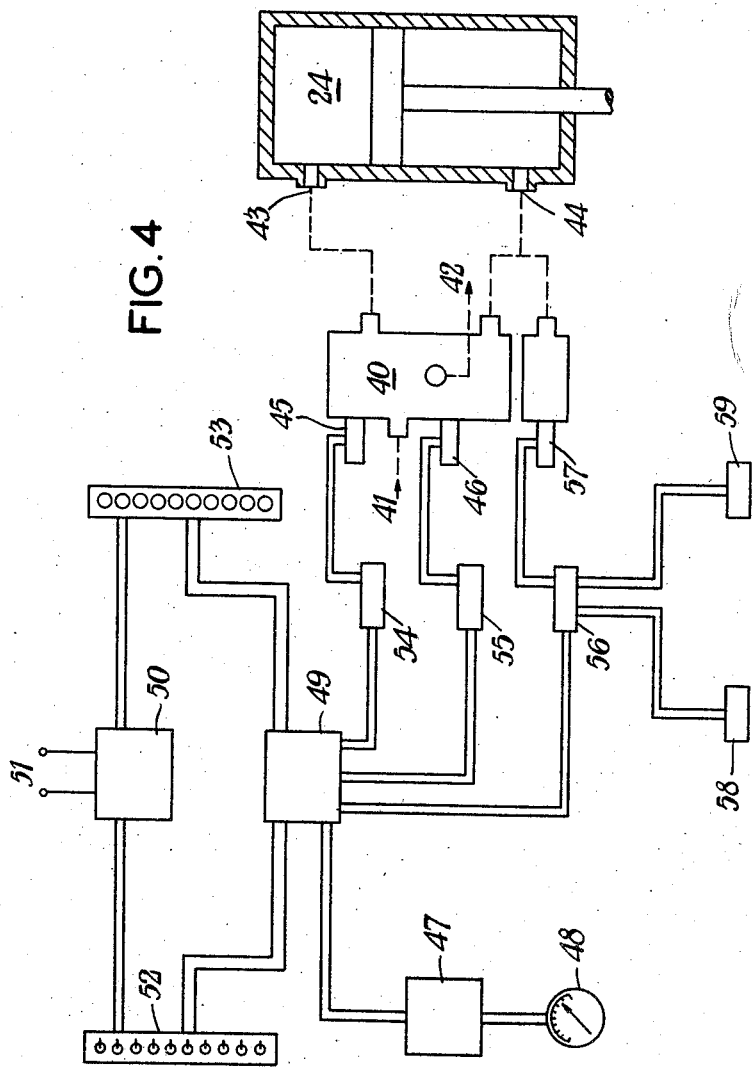

United States Patent Office 3,186,032
Patented June 1, 1965

3,186,032
VARIABLE AREA CROSS-HEAD
Norman Frederick Harwood, Kingston-on-Thames, Surrey, England, assignor to Baker Perkins Granbull Limited, Surrey, England, a British company
Filed Aug. 17, 1962, Ser. No. 217,673
Claims priority, application Great Britain, Aug. 23, 1961, 30,444/61
2 Claims. (Cl. 18—14)

The present invention relates to a variable area cross-head for use with a plastic extruder.

A main object of the present invention is to provide a generally improved variable area cross-head which is simple and robust in construction and operation.

According to the present invention there is provided a variable area cross-head for use with a plastic extruder including a cooperating outer nozzle and inner concentric mandrel assembly and cam means arranged to effect relative axial movement between said nozzle and mandrel to vary the size of an outlet orifice formed therebetween.

The term "cross-head" is used herein to denote a die into which extruded material passes.

In order that the invention may be more clearly understood and readily carried into effect two embodiments thereof will now be described with reference to the accompanying drawings, in which:

FIGURE 1 shows, diagrammatically, a sectional view of a variable area cross-head of the first embodiment, FIGURE 2 shows a fragmentary view illustrating a modified variable area cross-head, FIGURE 3 shows, diagrammatically, a part sectional view of a pair of variable area cross-heads of the second embodiment, and FIGURE 4 shows diagrammatically an electrical control circuit for the variable area cross-heads of the second embodiment.

Referring to FIGURE 1, the cross-head includes an extruder head orifice assembly, having an extrusion orifice 2 within which assembly a centrally positioned mandrel 3 is movable in order to adjust the the wall thickness of material extruded through the orifice. The material is fed from a plastic accumulator or injection cylinder 4 under the action of an injection piston 5, which is operable by a piston and cylinder assembly 6. The piston and cylinder assembly 6 is provided with two ports 7 and 8. The accumulator 4 is fed continuously with plastic material from an extruder, not shown and to which the variable area cross-head device is connected, through an orifice 9. Charging of the accumulator 4 is effected by connecting the port 8 to exhaust and feeding plastic material through the orifice 9 and, owing to the relatively high resistance offered to the material by the orifice assembly 1, the piston 5 is pushed back. When sufficient material has been forced into the injection cylinder 4 a trip device, not shown, initiates the supply of hydraulic fluid to the port 8 and port 7 is exhausted. This serves to drive the injection piston 5 back down the injector cylinder 4 causing extrusion of material through the orifice 2. If desired, during charging of the injection cylinder 4, the adjustable mandrel 3 may be arranged completely to close the orifice 2.

The extrusion orifice 2 will have a cross-sectional shape corresponding to the desired cross-sectional shape of the article being extruded. For example it will be annular for the extrusion of a cylindrical tube. The orifice exit end is flared either outwardly, as shown in FIGURE 1, or inwardly, as shown in FIGURE 2 to cooperate with a corresponding inwardly or outwardly flared end of the mandrel 3 which passes through the orifice 2. Thus, on axial movement of the mandrel 3 within the orifice 2, the space between the mandrel and the orifice is correspondingly opened or closed. This movement is provided by a further hydraulic ram and cylinder assembly 11 including a piston 12 which can be subjected to pressure from either side by means of ports 13 and 14 thus to effect upward or downward mandrel movement.

Control of the supply of hydraulic fluid to the ports 13 and 14 is provided by a servo valve 15 carried on an arm attached to the rod of the piston 12, for movement with the mandrel 3, the valve 15 having an operating plunger 16 in engagement with a linear cam 17 mounted for movement with the injection position 5. The valve 15 has an inlet, indicated at 18, connected to a hydraulic supply source and also a connection, indicated at 19, to exhaust. In dependence upon the position of the plunger 16 either of the ports 13 and 14 is connected to the hydraulic supply, the other being exhausted, or, in an intermediate position of the plunger 16 in order to lock the piston 12 in any predetermined position, both ports 13 and 14 are connected to the hydraulic supply. Thus, during a working stroke of the injection piston 5, the linear cam 17 is moved with this piston and the plunger 16 is caused to rise or fall dependent on the nature of the cam surface thus to subject either side of the piston 12 to fluid pressure in order to move the mandrel 3 up or down as desired. Since movement of the mandrel 3 will also cause movement of the valve 15, the desired position of the mandrel 3 will, when reached, be held. When the injection piston 5 reaches the end of its stroke the plunger 16 rides onto the unshaped part of the cam 17 and thereby actuates a microswitch for energising a solenoid which is operative to hold the plunger 16 in the upper position at which the port 13 is supplied with fluid and the port 14 is exhausted. During the ensuing re-charging of the accumulator 3 the plunger 16 is withheld until the afore-mentioned trip device is operated whereupon the solenoid is released. Thus the plunger 16 drops on to the cam surface at the commencement of an injection stroke. It should be pointed out that the travel available to the plunger 16 is relatively great and, therefore, this plunger does not leave the cam surface during a forward stroke of the injection piston 5.

It will be seen from the foregoing that movement of the mandrel 3 in either direction at any stage in the working stroke of the injection piston can be provided and requires only that a suitable cam surface be designed. Thus an extrusion of varying wall thickness dependent on the requirements desired may be provided within very wide limits. Furthermore any tendency of the wall thickness, at any particular point along the length of the extruded tube, to reduce under the weight of the material therebelow, as the extrusion progresses, can be compensated for.

Referring now to FIGURE 3, here two identical variable area cross-heads 21 are shown and each extrusion orifice 22 is of a shape more similar to that shown in FIGURE 2. A mandrel 23 is arranged for upward and downward movement within each orifice 22 to control the space between the mandrel and the inner wall surface of the orifice. The variable area cross-heads are arranged to be fed continuously by a nozzle, not shown, from an extruder, not shown, which may at the same time feed one or more other nozzles. A plastic accumulator may be utilised with this embodiment. Movement of the mandrels 23 is provided by a hydraulically operated piston and cylinder device 24 which serves to move a rack 25. The rack 25 is in mesh with pinions 26 mounted on the shafts of rotatable eccentric members 27 associated with the two mandrels 23 respectively. In this way operation of the piston and cylinder device 24 serves to produce upward and downward movement of the mandrel. Each mandrel 23 has a groove 28 thereon to allow the plastic material entering from the aforementioned nozzle to flow into the space between the mandrel 23 and the associated orifice 22.

In this embodiment each mandrel 23 is mounted on a rod 31 arranged to project upwardly out of a block 29 in which the associated orifice 22 is formed and to which the extruder is connected. The upper ends of the rods 31 are screwed into a further block 32 which is mounted for vertical sliding movement and which houses the rotatable eccentric members 27 of which each comprises a shaft 33 carrying an eccentric portion 34 and each eccentric portion is mounted within a bush 35. Each bush 35 is housed in a chamber 36 formed in the block 32 which chambers are each bounded by two diametrically opposed flats 37 in contact with the associated bush 35. The shafts 33 are mounted on bearings disposed in front of and behind the block 32.

In this way actuation of the piston and cylinder device 24 effects rotation of the eccentric members 27 which imparts upward or downward movement to the mandrel 23.

Referring to FIGURE 4 as well as FIGURE 3, the hydraulic cylinder 24 is supplied by hydraulic fluid through a solenoid actuated valve 40. The valve 40 has an inlet, indicated at 41, connected to a hydraulic supply source and also a connection, indicated at 42, to exhaust. The hydraulic cylinder 24 has two ports 43 and 44 and the valve 40 is provided with two actuating solenoids 45 and 46. The arrangement is such that if solenoid 45 is energized, port 44 is connected to the source 41 with port 43 connected to the exhaust 42 resulting in the cylinder 24 being operated to raise the mandrels 23, if solenoid 46 is energised, port 43 is connected to the source 41 with port 44 connected to the exhaust resulting in the mandrels being lowered and if both solenoids are de-energised, the valve spool is centered resulting in the mandrel piston being locked in a desired position.

The valve 40 is controlled by electrical control means including an impulse timer 47 having a setting unit 48, a uni-selector switch 49, a reset mechanism and a series of three-position toggle switches, for example, ten.

The circuit includes a power pack 50 which is fed from a supply source 51, a panel 52 for the ten toggle switches and a panel of pilot lights 53 each of which is illuminated as current is fed to the corresponding toggle switch. Each toggle switch is operative in its first position to energise the solenoid 45, in its second position to energise the solenoid 46 and in its third position to de-energise both solenoids. The circuit also includes two relays 54 and 55 for energising the solenoids 45 and 46 respectively together with a further, reset, relay 56 for energising a further, return, solenoid 57 which operates an additional hydraulic valve which by-passes valve 40 for rapid return. The reset mechanism includes microswitches 58 and 59 which are respectively controlled by the extrusion machine blow mould units and which control the relay 57. It should be explained that the machine of which the cross-heads 21 form part incorporates two blow mould units each comprising two mould halves. The units are each movable along a horizontal path between a position in which the mould halves close about two lengths of extruded material and a position whereat the mould halves open to discharge the blown articles. The blow mould units are operated cyclically.

In operation, by selecting the position of the toggle switches so current will flow to the appropriate solenoids of the valve 40, for example, three switches may be in one position two in another and say two in another and bearing in mind that a cycle of the blow moulding machine may be 9 seconds the impulse timer can be adjusted by means of the unit 48 to emit pulses of 0.82 second duration. These pulses cause the uni-selector 49 to rotate from one contact to another in turn at .82 second intervals and depending upon the position of the toggle switches so the double solenoid valve 40 will be actuated. Three switches in one position will allow the valve to supply fluid to the rack piston for $3 \times .82$ seconds$=2.46$ seconds, and say two switches in another position will allow the piston to be moved in the other direction for $2 \times .82$ seconds$=1.64$ seconds. It will be apparent, therefore, that by preselecting the positions of the toggle switch assembly so movement of the mandrel via the eccentric, rack pinion and piston will be achieved under control of the valve 40. Whilst ten toggle switches have been mentioned, it is not necessary that all of them be used—the particular form of mandrel control will dictate which switches must be used.

When the cycle has been completed, i.e. a desired length of the tubes extruded, a knife carried by the associated blow mould halves will sever the tube on closing of the moulds and actuate either the microswitch 58 or 59 as the case may be which sends a signal to the reset mechanism which by-passes the uni-selector switch, and in turn, via relay 58 sends a signal direct to the solenoid 57 which, upon actuation, causes the mandrel to rise with the minimum delay ready to move in response of signals via the toggle switches for the next cycle.

Alternatively the hydraulic piston and cylinder device 24 may be actuated cyclically which may be effected by means connected to the main shaft (not shown) on the blowing machine of which the cross-heads form part. As tubes are being extruded through the head, the rack piston moves forward on a full bore at a set constant velocity. With a constant piston velocity, the mandrels move with simple harmonic motion, therefore with a constant taper on the mandrels the variation on extrusion thickness would be a simple harmonic rate of change. This condition however can be changed by varying the shape of the mandrels. When the rack has completed its forward stroke at a set velocity, it must make a fast return stroke, which may be provided for in an associated hydraulic control circuit.

As an alternative eccentric means for adjusting the position of each mandrel 23 in relation to the associated orifice 22, each mandrel may carry, at its upper end, an open sided rectangular head mounted for vertical sliding movement, within which an externally rectangular block may slide transversely of the mandrel axis by a distance commensurate with the amount of eccentric movement. Each block would be provided with a bearing surface passing therethrough having its axis perpendicular to both the lateral direction of travel of the block and the axis of the mandrel. A cylindrical eccentric is then arranged to engage in each block, each eccentric shaft being carried for rotation in bearings as above. Similarly a pinion is mounted on each shaft externally of the mandrel head and a similar hydraulically actuated rack is adapted to engage these pinions thus to provide for rotation of the eccentrics and hence upward and downward movement of the mandrels.

It will be appreciated that the nozzle may feed two further cross-heads arranged in a pair, the mandrels of each pair depending from separate blocks and being controlled by separate piston and cylinder devices. Alternatively the nozzle may only feed the one cross-head. It will be further appreciated that the eccentrics may be arranged to lie in differing positions of rotation so as to, as it were, stagger the mandrel positions with regard to a given cycle of operation.

It will be further appreciated that either inwardly or outwardly flaring nozzle openings can be provided for either embodiment dependent on the requirements of any particular operation. Whilst hydraulic operation of the various mechanical parts of the two embodiments has been described it will be appreciated that any suitable source of mechanical movement may be provided, for example, gear and lever systems or, for small extrusion sections, even hand operated lever systems.

I claim:

1. In a machine for extruding plastic material, a variable area cross-head including an outer nozzle, an inner relatively movable mandrel defining with said nozzle a variable outlet orifice, an injection cylinder opening into said nozzle, an inlet for extrusion material in said cylinder, an injection piston within said injecton cylinder, means for operating said injection piston when said injection cylinder is charged to force said material past said mandrel and through said outlet orifice, a hydraulic piston and cylinder assembly operative to displace said mandrel relative to said nozzle to vary the size of said outlet orifice, means for supplying said hydraulic assembly with actuating fluid and a linear cam movable with said injection piston for controlling said hydraulic assembly supply means throughout each extrusion.

2. A variable area cross-head as set forth in claim 1 in which said hydraulic assembly supply means incorporates a valve having an operating plunger in operative engagement with said linear cam, said valve being adapted, in dependence upon the plunger position, to supply either side of the piston of said hydraulic assembly with fluid or to supply both piston sides to lock said mandrel.

References Cited by the Examiner

UNITED STATES PATENTS

| | | | |
|---|---|---|---|
| 2,044,961 | 6/36 | Waner | 18—14 |
| 2,184,057 | 12/39 | Parker | 91—189 XR |
| 2,363,179 | 11/44 | Harrington et al. | 91—189 XR |
| 2,474,187 | 6/49 | Olson | 91—189 XR |
| 2,632,202 | 3/53 | Haines | 18—5 |
| 2,750,625 | 6/56 | Colombo | 18—5 |
| 2,780,835 | 2/57 | Sherman | 18—14 |
| 3,002,615 | 10/61 | Lemelson | 18—2 |
| 3,005,231 | 10/61 | Pechthold | 18—5 |
| 3,019,481 | 2/62 | Negoro | 18—14 |
| 3,114,932 | 12/63 | Donnelly | 18—5 |

WILLIAM J. STEPHENSON, *Primary Examiner.*

MICHAEL V. BRINDISI, *Examiner.*